(12) United States Patent
Hernandez

(10) Patent No.: US 9,516,203 B1
(45) Date of Patent: Dec. 6, 2016

(54) DEVICE AND METHOD FOR GAZE ATTRACTION TOWARD CAMERA

(71) Applicant: Jason Hernandez, San Diego, CA (US)

(72) Inventor: Jason Hernandez, San Diego, CA (US)

( * ) Notice: Subject to any disclaimer, the term of this patent is extended or adjusted under 35 U.S.C. 154(b) by 0 days.

(21) Appl. No.: 14/719,040

(22) Filed: May 21, 2015

(51) Int. Cl.
*H04N 5/225* (2006.01)
*H04M 1/02* (2006.01)

(52) U.S. Cl.
CPC ......... *H04N 5/2252* (2013.01); *H04M 1/0254* (2013.01)

(58) Field of Classification Search
USPC .......................................................... 348/375
See application file for complete search history.

(56) References Cited

U.S. PATENT DOCUMENTS

| | | | | |
|---|---|---|---|---|
| 5,855,343 A * | 1/1999 | Krekelberg | ............ | F16M 11/08 248/121 |
| 6,264,379 B1 * | 7/2001 | Rydelek | ................ | G03B 17/56 224/908 |
| D507,007 S * | 7/2005 | Sitoh | ............................ | D16/202 |
| 7,289,726 B2 * | 10/2007 | Moriya | .................... | G03B 7/16 396/202 |
| 2007/0172223 A1 * | 7/2007 | Eberhardt | .............. | G03B 29/00 396/281 |
| 2009/0238548 A1 * | 9/2009 | Smith | .................... | G03B 15/00 396/5 |
| 2013/0208181 A1 * | 8/2013 | James | .................. | H04N 5/2252 348/375 |

* cited by examiner

*Primary Examiner* — Albert Cutler
(74) *Attorney, Agent, or Firm* — Donn K. Harms

(57) ABSTRACT

A device for holding a gaze-attracting object in a position adjacent to an electronic photographic device such as a digital camera or smart phone is provided. The device includes a body having one or a plurality first projecting members extending across a gap from a secondary projecting member. The device is positionable to an as-used position with a digital camera or smartphone engaged within the gap. Holding members projecting from the body opposite the gap, maintain an object therebetween and adjacent to the lens of the camera or smartphone or other digital photo device.

7 Claims, 5 Drawing Sheets

DEVICE AND METHOD FOR GAZE ATTRACTION TOWARD CAMERA

BACKGROUND OF THE INVENTION

1. Field of the Invention

The present invention relates generally to a method and apparatus for gaining and maintaining the gaze of a subject of a photo for a camera. More particularly, the invention relates to a housing which is adapted on a first end to engage a plurality of photographic devices such as smartphones, electronic cameras, pads, and the like, to provide a platform to hold an object calculated to obtain the attention and maintain a continual gaze of the subject of a photograph, toward the camera.

2. Prior Art

Photography has been a popular endeavor for professionals and nonprofessionals for decades. However, whether it be a film camera or a digital camera device, a vexing problem continues for professional and amateur photographers alike when it comes to taking portraits and similar photos of inattentive subjects.

Young children have for as long as cameras have been available been a popular subject for photos. However, with infants and young children, their attention span and ability to ascertain the presence and location of the camera capturing their photo is extremely limited. A similar problem occurs with pets such as dogs and cats. Such animals have no concept of a photograph or any need to maintain their gaze toward the camera lens prior to the activation of the shutter.

As a result, photographers taking photos of their pets, are continually frustrated with the resulting photos when the pet has turned their head or looked away. The same frustration is felt by parents and photographers when trying to get that great photo of a small child when the resulting photograph lacks the proper gaze and facial direction of the child.

In the past, photographers have attempted to attract a pet or child's attention by waving, or holding food or a toy or the like in one hand, while waiting for the subject of their photo to turn their head. Such has not worked well and frequently results in the photo being ruined by the movement of the photographer waving the object while trying to hold the camera in the other hand. Further, it is impossibly hard to position the object in line with the lens in most cameras and to hold the object inline with the front of the lens will ruin the shot. To position it behind the camera prevents the user from looking through the viewfinder or at the video display. As digital cameras have gotten smaller and been included in other devices such as smartphones and pad computers, the problem has ensued and gotten worse due to the small size of lenses and their sometimes odd placement on the electronic device.

Additionally, in dealing with pets, research has shown that scent, and a familiar favorite toy and slight movement thereof, and/or a scent thereon which is familiar, works better to attract and hold the attention and gaze of the pet toward the toy.

As a result, there is a continuing and unmet need for a system and method providing users the ability to position a gaze attracting object such as a toy or other object, adjacent and substantially inline with a camera lens, to thereby attract the subject to gaze toward the lens for a photo. Such a device should allow for the employment of objects familiar to the subject of the photo to increase their interest in looking at the object and toward the adjacent lens. Such a device should be configured for easy removable engagement to a plurality of different electronic devices and cameras to allow users to use it on all such devices.

Still further, when dealing with pet photography, such a device should enable the user to use a toy or object with which the pet plays to increase their attention and gaze toward the camera lens. Additionally, such a device might also include the ability to move the object upon the mount or housing to continuously attract the gaze of the subject of interest toward the camera lens and to allow the user to employ both hands for taking a photo.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in current prior art and accomplishes the above noted goals through the provision of a camera engageable housing which is configured on a first end for engagement to one or a plurality of electronic and film cameras in a frictional engagement therewith in a gap defined between opposing projecting members. The device is, thus, well adapted to engage upon film cameras and is especially well configured for engagement upon an edge of an electronic photography device such as a digital camera, a smart phone, a pad computer, and other electronic devices having a camera lens and built in processor for capturing digital images therethrough.

Such devices frequently place the lens of the camera included therewith, along one edge of the electronic device but not necessarily centered. The device herein employing the frictional engagement within a gap between projecting members is especially well adapted for a slide-on engagement to a side edge of the electronic device to place it adjacent to the lens of the camera. In one mode the housing can be configured with a fixed gap adapted to frictionally engage a range of widths of electronic devices through a slight flex of the members. In another mode the projecting members on opposing sides of the gap can be adjusted for distance therebetween and allow the user to adjust the size of the gap to allow the side edge mounting to the electronic device of choice, adjacent the lens.

On the opposite end of the housing from the gap employed for edge mounting to an electronic camera or device having one, is positioned a holder for an object, which is the means to attract and maintain the gaze of the subject of the photograph. As depicted herein a favored mode for pets such as dogs, a mount to removably engage a spherical toy such as a ball is provided. Balls are a favored toy of a majority of dogs because of their association with play and easily attract and maintain the attention and continued gaze of the dog toward the ball. With the housing properly engaged to a side edge of the electronic component or camera adjacent the lens, the gaze of the dog toward the lens is assured.

Optionally, the housing can include means to move the object placed in the holder. In one favored mode a small wheel is powered by a small electric motor to rotate the spherical ball slowly which has been shown in experimentation to increase the attention and the gaze of a dog toward the object which when mounted adjacent the lens increases the user ability to capture the face of the dog subject of the photo.

In addition to providing the housing with an adjustable gap, the device may also be provided with a housing having a connector at a central portion to allow engagement thereto of multiple holders to the housing. In this mode the projecting members form either a fixed or adjustable gap on one end of the housing and any one of a plurality of object holders are engageable to the connector to position each holder at the opposite end of the formed housing. Such allows for use of holders for photos, toys, balls, or holders of virtually any shape and configuration on their holding side, with the proper mating connector to engage them with the connector on the portion of the housing from which the projecting members are engaged.

With respect to the above description, before explaining at least one preferred embodiment of the herein disclosed invention in more detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods, and systems for carrying out the engagement of an object to an electronic or other camera device and the several purposes of the present disclosed device. It is important, therefore, that the claims be regarded as including such equivalent construction and methodology insofar as they do not depart from the spirit and scope of the present invention.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE PREFERRED EMBODIMENTS OF THE INVENTION

Figure 1:
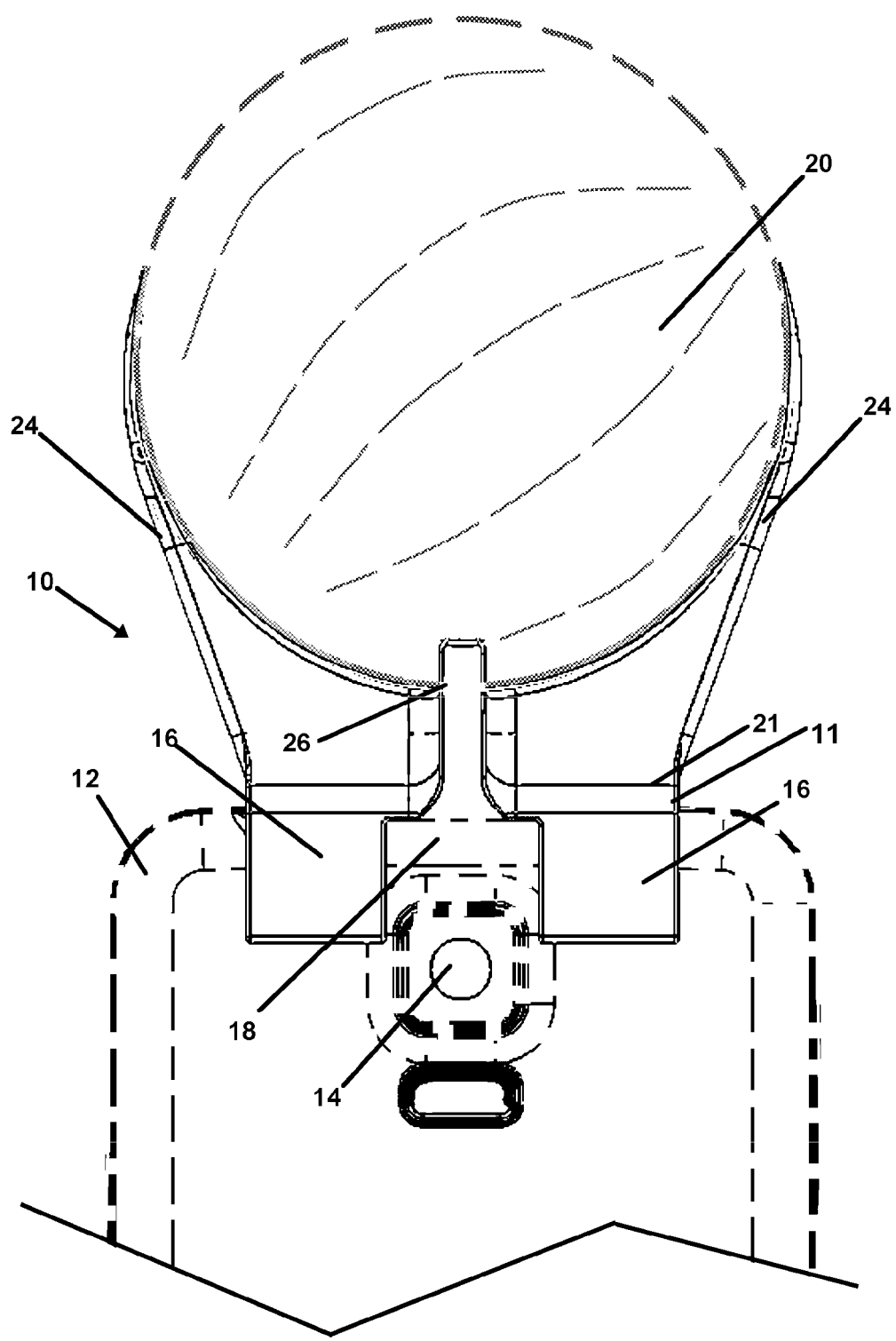
FIG. 1 depicts a mode of the device in an as-used position with a first end of a housing in an engagement with a side edge of a camera.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-8, wherein similar components are identified by like reference numerals, there is seen in FIG. 1 a favored mode of the device 10 herein which is shown in an as-used position, with the body 21 engaged with a side edge of a camera 12 or electronic device having a camera therein having a lens 14, using a connector 11 formed integral to the body 21.

Figure 3:
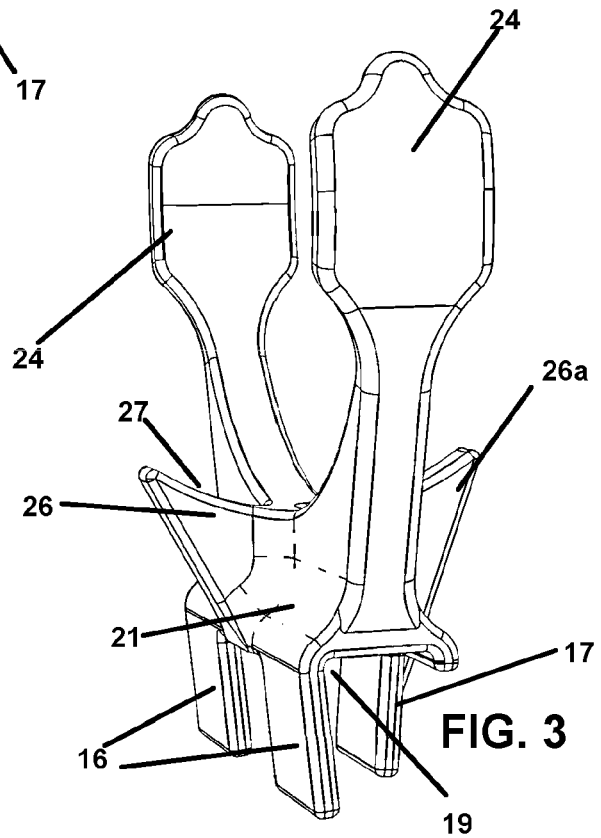
FIG. 3 depicts a perspective view of the device as in FIG. 2 and shows the projecting members and a gap formed therebetween declining in size from the first end of the body to the distal ends of the projecting members.

Also depicted, are the particularly preferred, at least one, but preferably a first pair of projecting members 16 or prongs. If a pair of first projecting members 16 are employed they project from a first side of the body 21 to distal ends and they define a slot 18 running in a plane therebetween projecting from a first side of the body 21 with the projecting members 16. The first projecting member or members 16 oppose a secondary projecting member 17 projecting from the first side of the body 21 across a formed gap 19. The gap 19 is sized for engagement of the body 21 of the device 10 over the side edge of a camera device, such as a smartphone or digital camera, which is thereby frictionally engaged therebetween. As shown in FIG. 3, the gap 19 can be formed with a diameter which declines in size from a widest diameter adjacent the body 21 to a narrowest diameter in-between the respective distal ends of the first projecting members 16 and secondary projecting members 17. If the first and secondary projecting members are formed of flexible but elastic material, the distal ends will flex when a digital camera is placed therebetween to an as-used positioning of the device herein, and provide a compressive engagement.

The device 10 is especially well configured in the preferred mode to provide the user a connector to the camera 12 providing a target for positioning the lens 14 in an optimum position relative to the body 21 of the device 10, using the slot 18 as the position of choice, to provide the user a target to align a central portion of the held object 20, directly above and adjacent to the electronic device lens 14 to thereby center the gaze of a photographic subject on the object 20, with the lens 14.

This preferred configuration with the slot 18, helps the user position the device 10 in a manner where the person or pet looking at the object 20 will seem in the photo taken, to be looking at the lens 14 directly adjacent and below. This is particularly preferred since holding the object 20 in the hand, or attaching it to another spot on the camera 12 or similar electronic component, will cause the object 20 to be side-positioned wherein the infant or pet whose gaze is drawn to the off-center object relative to the lens 14, will be looking away from the lens 14 and the photo taken thereby. This positioning of the lens 14 within the slot 18 works well when a human and pet are both looking at the camera for a joint photo since the human will know where to look, and the pet will have their gaze drawn to the object 20 operatively engaged with the device 10.

Also shown in FIG. 1 is the holder for the object 20 which as depicted, is configured to engage a planar solid or compressible object, and especially well configured to engage a globular object 20 such as a ball, between two curved opposing projecting holding members 24 projecting to distal ends from a second side of the body 21, and defining the object holder. It is especially preferred to also include the depicted center supports 26 which project in a curve to distal ends positioned above the second side 23 of the body 21 in a direction normal to an imaginary line running between the opposing projecting holding members 24.

The center supports 26 preferably include inclining top surfaces 27, preferably to form a curved ramp, which provide central support to prevent dismounting should the object be round or globular as the depicted ball. It was found during experimentation that the device 10 would function with globular or other objects engaged between the projecting members only, but that the device 10 performed in a superior fashion in the as-used position, engaged with a camera device, should the engaged camera, or the device 10, be moved suddenly or tilted along a plane running perpendicular to the edge of the camera 12 on which it is engaged. This is because sudden jolts or movements tended to dismount the held object if the center support 26 was not present, or in some cases not curved. Consequently, because the device may be employed with a globular object 20 or other odd-shaped objects, inclusion of the depicted center supports 26 are preferred.

Figure 2:
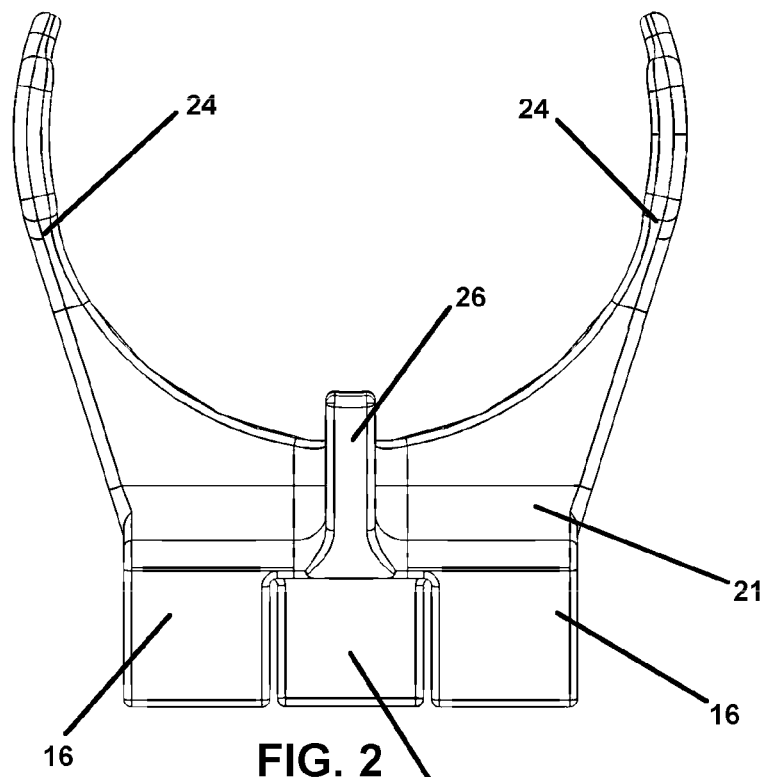
FIG. 2 shows a view of the device of FIG. 1 in an unengaged position wherein the object or ball is disengaged.

FIG. 2 depicts a rear view of the device 10 of FIG. 1, in a disengaged position. Also, the object 20 is dismounted to show the gap formed between the pair of opposing holding members 24 and the curved inward surfaces of the two opposing holding members 24 which adapts the device 10 to removably engaged globular and circular shaped objects 20 as well as planar sided objects.

Additionally shown in FIG. 2, is the connector for the body 21 to a camera or the like. In a preferred mode the connector features an opposing prong or secondary projecting member 17 having a formed gap 19 for engagement of the camera 12 edge, between it and the first pair of opposing projecting members 16 which define the slot 18, which is an opposing position to the rear prong or secondary projecting member 17. The first pair of projecting members 16 and the rear or secondary projecting member 17 all project from respective first ends engaged with a body 21 of the device 10 to distal ends and define a connector for the body 21 to the camera which is frictionally or compressibly engaged in the gap 19.

FIG. 3 depicts a perspective view of the device 10 in FIG. 2 and shows the connector formed by the first projecting members 16 and secondary member 17 and gap 19 formed therebetween. As depicted in this and other figures, the gap 19 can be and preferably is declining with a narrowest portion between the distal ends of the projecting members 16 and secondary projecting member, to a wider portion adjacent the body 21. In modes of the device 10 with the connector employing this narrowing gap 19 and where the projecting members 16 and secondary projecting member 17 are formed of pliable material, such as plastic or polymeric material or flexible metal or the like, a biased or compressive engagement to the edge of the electronic device or camera 12 can be achieved where the opposing first pair of members 16 compress the camera 12 against the rear or secondary projecting member 17. Additionally, this narrowing gap 19, provides the connector the ability to adjust to differing camera thicknesses and engage them with a secure engagement with the edge of the camera abutting the body 21 within the gap, and with the members 16 and secondary member 17 flexing to accommodate the thickness of the camera positioned in the gap 19 in the biased engagement.

Figure 4:
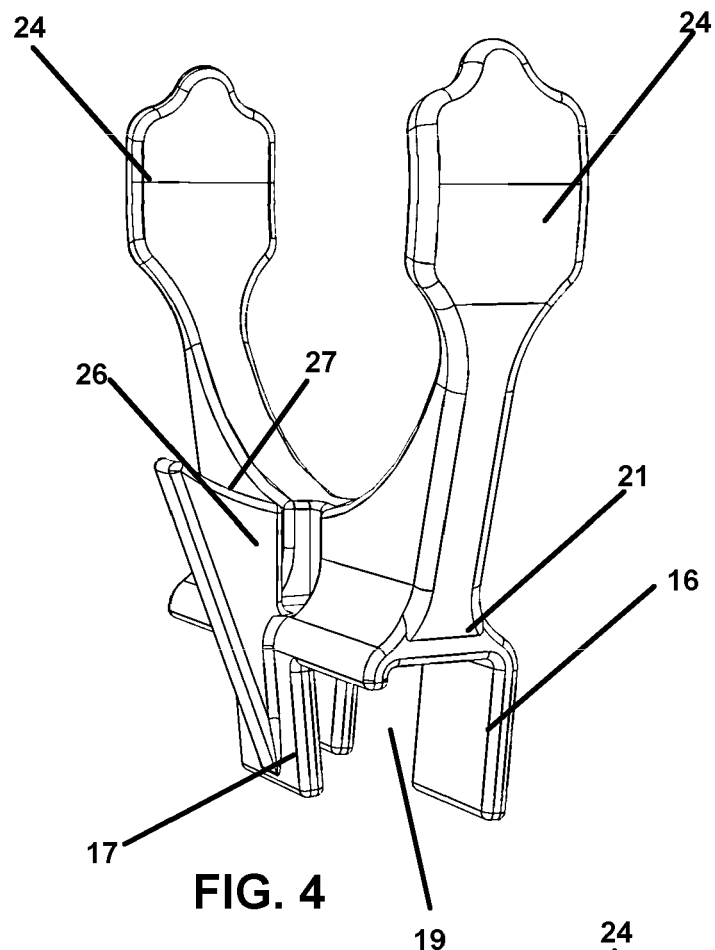
FIG. 4 is a reverse view of the device from that of FIG. 3.
Figure 5:
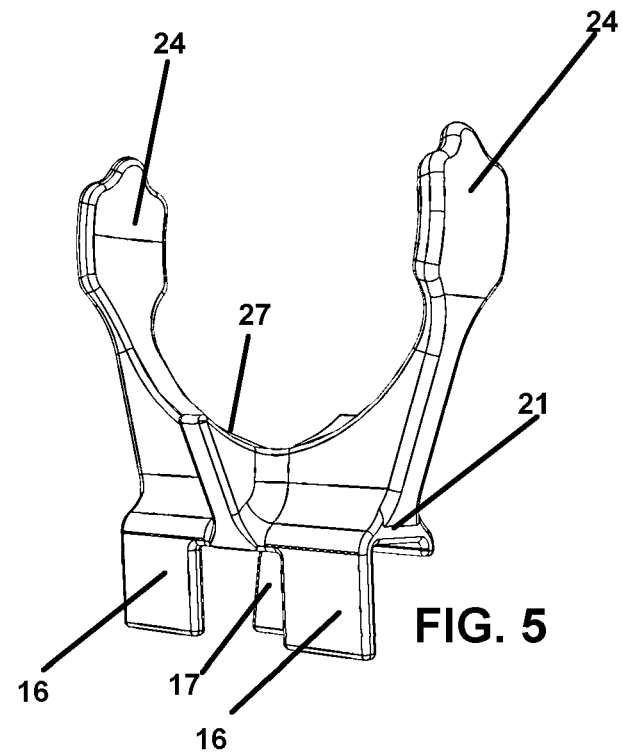
FIG. 5 depicts the device of FIG. 4 from a different perspective view.

FIG. 4 is a reverse view of the device from that of FIG. 3 showing the central positioning of the rear or secondary projecting member 17 opposite the slot and in between the first pair of projecting members 16. FIG. 5 depicts the device 10 of FIG. 4 from a different perspective view of the front of the device 10.

Figure 6:
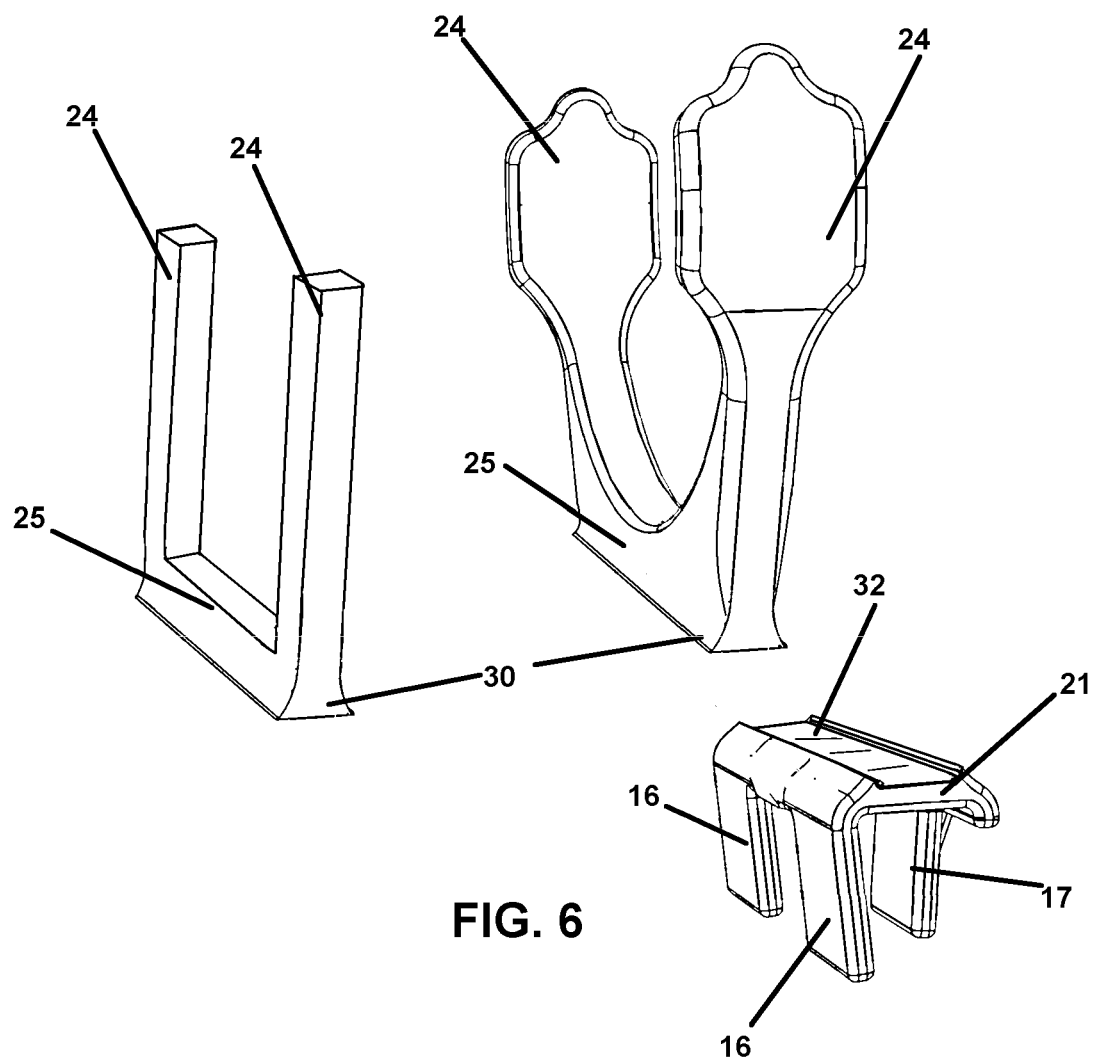
FIG. 6 shows a mode of the device having disengageable holders for attachments to a body having the projecting members forming the engagement gap.

FIG. 6 shows a mode of the device 10 having disengageable holders 25 which may be adapted in configuration and shape to best engage the object 20 intended. The holders 25 have respective first ends 30 which have a connector to engage a mating connector on the body 21. As depicted, one mode of such connectors is shaping the first ends 20 for a cooperative removable engagement with a complimentary surface 32 of the body 21. Although any removable engagement between the body 21 and the holders 25 as would occur to those skilled in the art will work.

Figure 7:
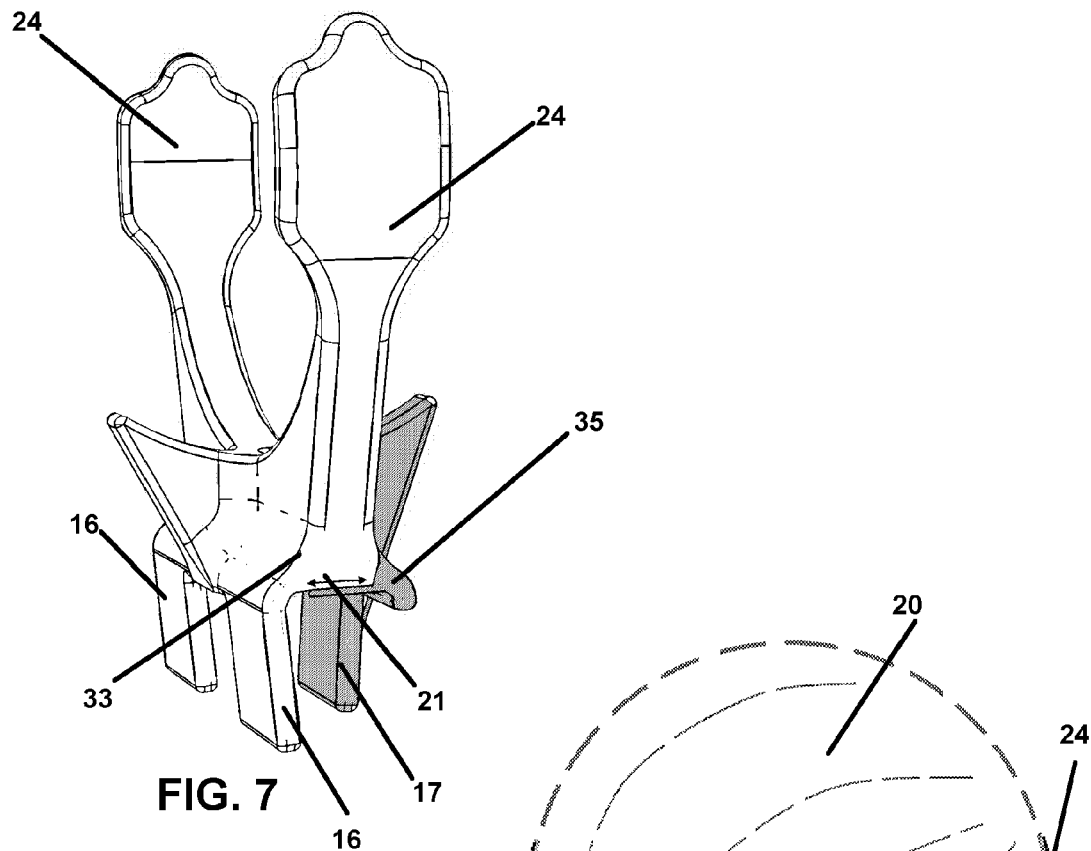
FIG. 7 shows a mode of the device wherein front and rear portions are translatabley adjustable for adjusting the size of the gap between the projecting members.

FIG. 7 shows a mode of the device 10 wherein front 33 and rear 35 portions of the body 21 engaging the holder 25 and projecting members 16 and secondary projecting member 17, are translatabley adjustable with each other. In use, the user may adjust the rear 35 of the body closer to or further from the front 33 portion of the body 21 and thereby adjust the size of the gap 19 between the first pair of projecting members 16 and the rear or secondary projecting member 17. Adjusting the gap 19 allows the device 10 to engage cameras 12 and electronic components of differing thickness, and provides a means to adjust he biased compressed engagement of the device 10 thereon.

Figure 8:
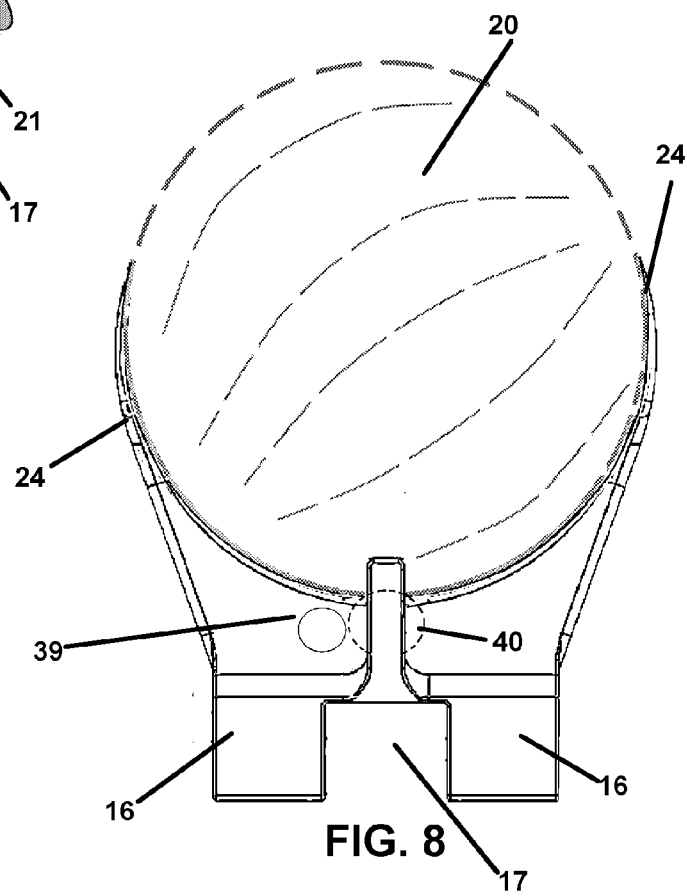
FIG. 8 shows a mode of the device having a means to move the held object such as a motor.

FIG. 8 depicts a mode of the device 10 having a means to move the held object 20 such as a motor 39 in operative engagement with a wheel 40 positionable in contact with the object 20. In this mode the object 20 would be loosely held by the holder 25 and would move within the engagement therewith.

It should be noted while described herein and shown in the drawings, this invention has other applications, potentially, and one skilled in the art could discover these. The explication of the features herein and in the drawings of this invention does not limit the claims of this application.

It is additionally noted and anticipated that although the device is shown in its most simple form, various components and aspects of the system disclosed may be differently configured or slightly modified when forming the invention herein. As such, those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the gaze attracting invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

The invention claimed is:

1. An apparatus for holding a gaze-attracting object, in a position adjacent to an electronic photographic device, comprising:
   a body having a first side opposite a second side;
   a pair of first projecting members extending from a first end engaged to said first side of said body, to respective distal ends;
   a slot positioned in-between said pair of first projecting members, said slot extending from said first side of said body to a line running between said respective distal ends;
   at least one secondary projecting member projecting from an engagement to said body at said first end, to a distal end thereof;
   a gap formed between said pair of first projecting members and said secondary projecting member, said gap having a diameter adapted to engage with said body with an electronic photographic device in an as-used positioning with said electronic photographic device therebetween;
   said slot positionable to have one each of said first pair of projecting members positioned on opposite sides of said lens of said electronic photographic device during positioning of said body to said as-used positioning;
   said slot forming a target for a user to place said lens in an alignment with a central portion of said gaze-attracting object between a pair of holding members, whereby said gaze attracting object is centrally aligned with said lens;
   said pair of holding members projecting from respective first ends engaged with said second side of said body to respective distal ends;
   said holding members each having an opposing interior surface defining a space therebetween,
   said space adapted to frictionally engage said gaze-attracting object therebetween, whereby with said body in said as-used positioning said gaze-attracting object is positioned adjacent to a lens of said electronic photographic device;
   a pair of center supports extending from first ends engaged with said body to respective distal ends;
   said pair of center supports extending from opposing positions at a central portion of said second side of said body;
   said distal ends of said center supports projecting above a first side surface on said second side of said body;
   said distal ends of said center supports providing contacts for preventing movement of said object held in said space between said holding members, in a direction normal to a line running between said holding members.

2. The apparatus for holding a gaze-attracting object of claim 1 wherein said gap formed between said pair of first projecting members and said secondary projecting member, decreases from a maximum said diameter adjacent said first side of said body, to a minimum said diameter between respective said distal ends of said pair of first projecting members and said secondary projecting member; and
   said pair of first projecting members and said second projecting member are formed of flexible material, whereby said electronic photographic device in said as-used positioning is in a compressive engagement within said gap.

3. The apparatus for holding a gaze-attracting object of claim 2 additionally comprising:
   each of said opposing interior surfaces of said holding members being curved in an opposing direction do the respective opposing surface of the other.

4. The apparatus for holding a gaze-attracting object of claim 2 additionally comprising:
   each of said pair of center supports extending in a respective curve, from respective said first ends engaged with said body to respective said distal ends.

5. The apparatus for holding a gaze-attracting object of claim 1 additionally comprising:
   each of said opposing interior surfaces of said holding members being curved in an opposing direction do the respective opposing surface of the other.

6. The apparatus for holding a gaze-attracting object of claim 5 additionally comprising:
   each of said pair of center supports extending in a respective curve, from respective said first ends engaged with said body to respective said distal ends.

7. The apparatus for holding a gaze-attracting object of claim 1 additionally comprising:
   each of said pair of center supports extending in a respective curve, from respective said first ends engaged with said body to respective said distal ends.

* * * * *